United States Patent

[11] 3,628,983

[72] Inventors Lucien F. Leger
  Montigny-le-Tilleul;
  Jose Lelong, Fleurus, both of Belgium
[21] Appl. No. 723,626
[22] Filed Apr. 23, 1968
[45] Patented Dec. 21, 1971
[73] Assignee Glaverbel S.A.
  Watermael, Baitsfort, Belgium
[32] Priorities Apr. 27, 1967
[33]  Luxembourg
[31]  53,535;
  Mar. 19, 1968, Great Britain, No.
  13,246/68

[54] COATING METHOD FOR STRENGTHENING VITREOUS AND VITROCRYSTALLINE BODIES
  29 Claims, No Drawings
[52] U.S. Cl. .................................................. 117/40,
  117/62, 117/124 A, 117/124 B, 117/124 C,
  117/124 T, 117/169 R
[51] Int. Cl. ..................................................... C03c 21/00

[50] Field of Search ............................................ 117/123 A,
  124 A, 40, 62, 169, 124 T, 124 C, 124 B; 65/30

[56] References Cited
UNITED STATES PATENTS

| | | | |
|---|---|---|---|
| 2,690,065 | 9/1954 | Harman et al. | 117/43 X |
| 3,222,206 | 12/1965 | Cornelissen | 117/40 X |
| 3,024,303 | 3/1962 | Smothers et al. | 117/124 X |
| 3,055,762 | 9/1962 | Hoffman | 117/124 X |
| 3,434,817 | 3/1969 | Hazdra et al. | 117/124 X |
| 3,453,095 | 7/1969 | Loukes et al. | 65/30 |
| 3,460,927 | 8/1969 | Fischer et al. | 65/30 |
| 3,464,880 | 9/1969 | Rinehart | 117/124 X |

*Primary Examiner*—Alfred L. Leavitt
*Assistant Examiner*—Wayne F. Cyron
*Attorney*—Spencer & Kaye

ABSTRACT: A process for physically strengthening vitreous and vitrocrystalline bodies by applying to at least portions of the surface thereof coatings in which compressive stresses can be produced by appropriate chemical modifications thereof, and by carrying out such chemical modifications and subsequently cooling the coatings.

COATING METHOD FOR STRENGTHENING VITREOUS AND VITROCRYSTALLINE BODIES

BACKGROUND OF THE INVENTION

This invention relates to a method of strengthening vitreous and vitrocrystalline bodies, such as sheets, and to bodies which have been strengthened by this method.

It is well known that glass is much stronger under compressive loads than under tensile loads, and that this is due to small imperfections or flaws in the surface of the glass, which flaws act as stress increasers. The tensile strength of this material can be improved by a thermal tempering process which has the effect of producing or increasing compressive stresses in the surface layers of the glass. Thermal tempering involves heating of the glass to a temperature close to its softening point and then rapidly chilling the glass in a current of air. One limitation of this process is that it can only be applied to glass in sheet form if the glass has a thickness of about 3 mm. or more.

SUMMARY OF THE INVENTION

It is a primary object of the invention to overcome, or eventually reduce, these drawbacks and difficulties.

Another object of the invention is to improve the physical strength of such bodies.

Still another object of the invention is to impart a high tensile strength to relatively inexpensive ordinary glass materials.

These and other objects according to the invention are achieved by the provision of a process for physically strengthening a layer of vitreous or vitrocrystalline material, which process includes the steps of covering the layer, at least at surface zones which are symmetrically disposed at respectively opposite sides of the medium surface of the layer, with a solid coating of a material having such a composition that compressive stresses can be produced therein by a chemical modification thereof while the coating is in solid state and in a heated condition and by cooling the thus chemically modified coating, maintaining the coating in such heated condition and effecting such modification, and subsequently cooling the chemically modified coating.

DESCRIPTION OF THE PREFERRED EMBODIMENTS

The present invention provides a method by which such thin glass sheets, and other bodies made of vitreous or vitrocrystalline material, can be substantially strengthened. It also provides physically strengthened layers of vitreous or vitrocrystalline material prepared by such method.

According to the invention, a base layer of vitreous or vitrocrystalline material is covered, either entirely or at zones which are symmetrically disposed at respectively opposite sides of the median surface, which will be defined below, of the base layer, with a solid coating or coatings of such a composition that compressive stresses can be produced or increased by chemically modifying the coating while in a heated condition and by then cooling the coating or coatings, and after the coatings have been applied, such a chemical modification and subsequent cooling are carried out.

The expression "median surface" as herein used in relation to the base layer or substrate is defined as an imaginary surface or plane every point of which is equidistant from two opposed surfaces of the body, these opposed surfaces usually being the two major surfaces of the body. Thus, the median surface of a flat sheet is a plane midway between, and parallel with, the two major surfaces of the sheet.

The following description and explanation of the invention will make reference primarily to materials in sheet form but is is to be understood that the invention includes in its scope processes in which the base layer has some other physical form, such as a tubular form, or constitutes part of the wall of a hollow ware article. It will thus be understood that the base layer need not be flat but can follow a plane having any curvature.

As the term "layer" implies, the coated substrate always has length and width dimensions which are many times as great as its thickness. In most cases, for example, when the invention is applied to ribbons of drawn glass, or to sheets into which such ribbons have been cut, the length and width dimensions will be hundreds of times as great as the thickness, but substrates of relatively small size with length and width dimensions of as little as 10 times the thickness are not excluded from the range of bodies which can be advantageously prepared according to the invention.

The invention includes methods wherein only a part of a base layer is covered by a coating or coatings which are subjected to chemical modification. This might be desirable if the base layer, due to its form or the intended manner of its use, is particularly vulnerable to damage by forces imposed at particular regions thereof. In such cases, the invention affords advantages even if a coating under compression is present only at those regions.

For example, glass sheets are particularly vulnerable to breakage by contact of their edges with a hard object, such as a nail. Their susceptibility to breakage due to that cause can be reduced by the presence of coatings under compression on the edges of the sheet and possibly also on the opposed major surfaces of the sheet along marginal zones thereof, for example, marginal zones having a width of about 1 to 5 mm. or more.

It may be appreciated that a coating covering any one edge of a rectangular sheet covers, in effect, two contiguous zones, each of one-half the thickness of the sheet, which are disposed at respectively opposite sides of the median surface of the sheet, and the invention includes processes in which only one or more edges of the base layer are provided with a coating. Coatings along any one margin of a sheet, on its major faces, are of course also disposed to respectively opposite sides of the median surface of the sheet.

As another example, a tumbler is much more likely to be broken by a slight impact at its rim than by a similar impact on its side. If the rim and/or the inside and outside surfaces of the tumbler adjacent the rim are provided with coatings in accordance with the invention the tumbler is less likely to break.

Coatings on surfaces or surface portions on opposite sides of the median surfaces should normally be of the same composition and be subjected to the same chemical modification treatment. However, if it is desired to prepare a product with compressive stresses of different magnitudes on opposite sides of the median plane of the base layer, this can be done by using different compositions for the different surface coatings and/or by chemically modifying such coatings to different extents and/or in different ways. Likewise, coatings on opposite surfaces of the base layer should normally be substantially coextensive. In other words, it is preferable for a chemically modified coating on one surface of the sheet not to extend to a given zone unless the corresponding zone on the opposite surface also bears a chemically modified coating, but a small latitude in this respect is quite allowable, even if the base layer is to be substantially symmetrically stressed by the coatings.

The invention is useful for strengthening glass sheets less than 3 mm. in thickness as well as thicker glass sheets.

The coated substrate is preferably in a solid state throughout the performance of the process.

In order that the coating can be chemically modified throughout its entire thickness, it is preferable for the coating to be not more than 1 mm. in thickness. A vitreous or vitrocrystalline body can be substantially strengthened in accordance with the invention even if the coating subjected to chemical modification is very thin, and the thickness of the coating is preferably in the range 1 to 150 microns.

By means of the invention, compressive surface stresses may be created which, if the sheet is accidentally broken, result in the spontaneous division of the sheet into small noncutting pieces. For ensuring a division into fragments having substantially uniform size, it is an advantage for the stress distribution to be substantially uniform over the surfaces of the coated substrate and for this reason it is an advantage for the coatings to be vitreous.

Coatings consisting of, or containing, one or more metals are preferred. A metal element can, if desired, be added to a coating previously formed on the substrate, the metal being added before the chemical modification treatment is performed.

The composition of the coating or coatings can be selected so as to impart a predetermined color or other predetermined optical effect to the product.

The chemical modification may achieve the required effect, for example, by increasing the volume of the material composing the coating and/or by conferring on the coating a lower coefficient of thermal expansion. By way of example, compressive stresses can be produced by causing an element or compound in the coating to combine either with another substance brought into contact with the coating or with a constituent of such a substance.

If the coating contains a metallic reactive element of invariable valency, this has an advantage in avoiding the occurrence of a nonuniform stress distribution which would otherwise occur due to the formation of different compounds representing different stages in an oxidation-reduction reaction.

According to one particular method of the invention, an oxidizable coating is applied to the base layer and compressive stresses are created in the coating by subjecting the coating to an oxidation treatment. The coating may consist of a single metallic element, such as tin, titanium, silicon, vanadium, lead, manganese, aluminum, zirconium, thorium, bismuth or nickel. Alternatively, the coating may contain a lower valency compound of a multivalent element, for example, SiO, TiO, SnO, and PbO.

Thin coatings of such substances can be deposited by a chemical, physiochemical or physical process, but preferably the coating or coatings on the substrate is or are formed by vacuum vaporization since this method is particularly conductive to the formation of layers well suited to the requisite subsequent processing. Oxidation can be performed with an oxidizing agent in gaseous form, such as ozone, or in liquid form, such as molten potassium nitrate.

Higher compressive stresses can, however, be set up by causing one or more substances in the coating to combine with an element whose ions are of larger radius than oxygen ions. Thus, such higher stresses can be produced by a reaction between a metal in the coating with either anions, such as $S^{--}$, $Te^{--}$, or $Se^{--}$, or with the corresponding nonionized elements. The chemical reaction or reactions should occur below the softening point of the substrate in order to avoid stress relaxation.

Another way of carrying out the invention is to form on the substrate a coating or coatings of glass which can be chemically tempered, as by introducing ions into the coating from a contacting medium in exchange for smaller ions at a temperature below the annealing point of the glass, thereby increasing the density of the material forming the coating, or by replacing ions in the glass coating, at a temperature above the strain point, by other ions which confer on the coating a lower coefficient of thermal expansion. Both types of chemical tempering process are well known, per se.

Normally the ion exchange involves an exchange of alkali metal ions, for example, a replacement of sodium ions in the glass by potassium ions in the first type of process and a replacement of sodium ions by lithium ions in the second type of process.

An important use of the present invention is for strengthening the margins of a glass sheet preparatory to chemically tempering the sheet. After covering margins of the glass sheet with a coating of glass of a composition selected so that this glass is more easily chemically tempered than the glass substrate, the whole sheet is subjected to a chemical tempering treatment, such as, by dipping the sheet in a chemical tempering bath. In the result, the whole sheet is tempered but the compressive stresses are greater at the marginal zones than elsewhere.

The following are examples of processes according to the invention:

EXAMPLE 1

A 60 titanium film was deposited by vacuum vaporization on the surfaces of a round soda-lime glass disc 12 cm. in diameter and 1.5 mm. thick. The disc was heated to a temperature of 550° C. The hot disc was placed in contact with ozone for 4 hours. After cooling, it was found that the disc had a tensile strength three times as high as that of an identical disc which had been coated in the same way with titanium but which had not been subjected to the oxidation treatment.

EXAMPLE 2

By chemical means, using an alkaline solution of stannous chloride, an SnO film 100μ thick was deposited on the internal and external surfaces of a soda-lime glass beaker. The beaker was heated to a temperature of 500° C. The hot beaker was placed in contact with molten potassium nitrate for 3 hours. After cooling, it was found that the beaker had a tensile strength twice that of an identical beaker which had been coated in the same way with a film of SnO but which had not been subjected to the chemical treatment.

EXAMPLE 3

A sheet of partially devitrified glass 3 mm. in thickness and formed from the following composition, by weight:

| | |
|---|---|
| $Li_2O$ | 15% |
| $Al_2O_3$ | 10% |
| $SiO_2$ | 50% |
| CaO | 10% |
| $B_2O_3$ | 8% |
| $TiO_2$ | 7% | was coated on both faces with a mixture of germanium and sodium in the weight proportion of 80:20 by a simultaneous vaporization of these elements. The coatings were 2 microns in thickness. The coated sheet was then exposed to hydrogen sulfide gases for a quarter of an hour at 90° C. The sheet was then maintained at 250° C. for 1 hour during which time the germanium was sulfurized by the sodium polysulfides previously formed. The resulting coatings were vitreous, had a pale red color and approximated in composition a mixture of $GeS_2$ and $Na_2S$. The tensile strength of the coated sheet after the chemical modification of its coatings was 55 kg./mm.² whereas its tensile strength before such modification was only 25 kg./mm.².

EXAMPLE 4

Vitreous layers composed of a mixture of $GeS_2$, CdS and $Na_2S$ in proportions of 75, 15 and 10 percent, by weight, were formed on a sheet of soda-lime glass 1.5 mm. in thickness by depositing Ge, Cd, and Na on the opposed faces of the glass by simultaneous vaporization of these elements in vacuo to form coatings 3 microns in thickness and by then sulfurizing such coatings. The sheet bearing the sulfide coatings was then immersed in a bath composed of a mixture of KCl and $AlCl_3$ in a molecular proportion of 70:30 and at a temperature of 270° C. The sheet was kept immersed in the bath for 3 hours and then withdrawn, cooled and washed. Electronic microsonde examination showed that a replacement of sodium ions by potassium ions had taken place through the entire thickness of the vitreous coatings and even in surface layers of the glass sheet. The tensile strength of the coated sheet after the ion exchange treatment was three times as great as the tensile strength of the coated sheet before such treatment.

EXAMPLE 5

An enamel composed of the following ingredients in the following molecular proportions:

| | |
|---|---|
| $SiO_2$ | 40% |

| | |
|---|---|
| $B_2O_3$ | 10% |
| PbO | 25% |
| $PbF_2$ | 5% |
| NaF | 10% |
| $ZrO_2$ | 3% |
| CdO | 7% | and containing in addition 2 percent, by weight, of very fine zinc powder (grain size ≤2 microns), was deposited on the opposed faces of a vitrocrystalline sheet of the same composition as the sheet used in example 3, the enamel coatings being 0.3 mm. in thickness. The coated sheet was then exposed to a stream of dry hydrogen selenide gas at 400° C. for 2 hours. After cooling it was found, by microsonde examination, that the zinc had reacted with selenium ions to form ZnSe, which was recognized by diffraction examination to be in the vitreous state. The tensile strength of the coated sheet, following the treatment with hydrogen selenide, was twice the tensile strength of the coated sheet before that treatment.

It will be understood that the above description of the present invention is susceptible to various modifications, changes and adaptations, and the same are intended to be comprehended within the meaning and range of equivalents of the appended claims.

We claim:

1. A process for physically strengthening a layer of vitreous or vitrocrystalline material comprising the steps of:
   I. covering at least surface zones of the layer, which are symmetrically disposed at respectively opposite sides of the layer's median surface, with a solid coating having a composition wherein compressive stresses are produced by
      a. chemical modification thereof while the coating is in solid state and in a heated condition followed by
      b. cooling the thus chemically modified coating;
   II. maintaining the coating in such heated condition and effecting such modification; and
   III. subsequently cooling the chemically modified coating.

2. A process as defined in claim 1 wherein the thickness of the layer is less than 3 mm.

3. A process as defined in claim 2 wherein the thickness of the coating is no greater than 1 mm.

4. A process as defined in claim 3 wherein the thickness of the coating is between 1 and 150 microns.

5. A process as defined in claim 1 wherein the coating is of a vitreous material.

6. A process as defined in claim 1 wherein the chemical modification of the coating involves the chemical combination of one ingredient in the coating with at least one ingredient of a substance brought into contact with the coating during said step of effecting such modification.

7. A process as defined in claim 6 wherein the chemical modification involves the oxidation of a metal or metal compound forming one ingredient of the coating.

8. A process as defined in claim 7 wherein the oxidation is carried out by contacting the coating with an oxidizing agent.

9. A process as defined in claim 7 wherein the oxidation is carried out by contacting the coating with molten potassium nitrate.

10. A process as defined in claim 6 wherein the coating contains a metal and the chemical modification involves the chemical combination of such metal with an oxidizing element whose ions have a greater radius than that of oxygen ions.

11. A process as defined in claim 6 wherein one ingredient of the coating is a metallic element having an invariable valency.

12. A process as defined in claim 6 wherein the coating consists of a single metallic element.

13. A process as defined in claim 1 wherein said step of effecting such modification is carried out by bringing the coating into communication with an ion exchange medium and producing an ion exchange between alkali metal ions in the coating and different alkali metal ions in the medium.

14. A process as defined in claim 13 wherein the modification involves replacement of alkali metal ions in the coating by ions derived from the medium and which confer on the coating a lower coefficient of thermal expansion, the heated condition being at a temperature above the strain point of the glass constituting the coating.

15. A process as defined in claim 13 wherein the coating is of glass, said step of maintaining the coating in such heated condition is carried out so as to maintain the coating at a temperature below the annealing point of the glass constituting the coating, and the ion exchange involves the replacement of ions in the coating by larger ions derived from the medium.

16. A process as defined in claim 13 wherein the coating is applied so as to cover only one or more margins of the layer and the entire layer is subjected to such chemical modification.

17. A process as defined in claim 1 wherein the layer is constituted by a soda-lime glass disc having a diameter of 12 cm. and a thickness of 1.5 mm., the coating is a titanium film having a thickness of 60 m$\mu$, said step of maintaining the coating in such heated condition is carried out by maintaining the coated disc at a temperature of 550° C., and said step of effecting such modification is carried out by maintaining the coating in contact with ozone for 4 hours.

18. A process as defined in claim 1 wherein the layer constitutes a beaker made of soda-lime glass, the coating is a film of SnO having a thickness of 100 m$\mu$ and deposited on the internal and external lateral surfaces of the beaker, said step of maintaining the coating in such heated condition is carried out by maintaining the coated beaker at a temperature of 500° C., and said step of effecting such modification is carried out by placing the coating in contact with molten potassium nitrate for 3 hours.

19. A process as defined in claim 1 wherein the layer is a partially devitrified glass having the following composition, by weight:

| | |
|---|---|
| $Li_2O$ | 15% |
| $Al_2O_3$ | 10% |
| $SiO_2$ | 50% |
| CaO | 10% |
| $B_2O_3$ | 8% |
| $TiO_2$ | 7% | the coating is constituted by a mixture of germanium and sodium in the weight proportion of 80:20 and has a thickness of 2$\mu$, and said steps of maintaining the coating in such heated condition and effecting such modification are carried out by maintaining the coated glass in contact with hydrogen sulfide gasses at a temperature of 90° C., and then maintaining the sheet at a temperature of 250° C. for 1 hour.

20. A process as defined in claim 1 wherein the layer is constituted by a sheet of soda-lime glass, the coating is constituted by a mixture of Ge, Cd and Na having a thickness of 3$\mu$, which coating is preliminarily sulfurized, and said steps of maintaining the coating in such heated condition and effecting such modification are carried out by immersing the coated sheet in a bath composed of a mixture of Kcl and $AlCl_3$ in a molecular proportion of 70:30 and at a temperature of 270° C. for 3

21. A process as defined in claim 1 wherein the layer is constituted by a sheet of partially devitrified glass having the following composition, by weight:

| | |
|---|---|
| $Li_2O$ | 15% |
| $Al_2O_3$ | 10% |
| $SiO_2$ | 50% |
| CaO | 10% |
| $B_2O_3$ | 8% |
| $TiO_2$ | 7%, | the coating is constituted by an enamel having the following ingredients in the following molecular proportions:

| | |
|---|---|
| $SiO_2$ | 40 |
| $B_2O_3$ | 10 |
| PbO | 25 |
| $PbF_2$ | 5 |
| NaF | 10 |
| $ZrO_2$ | 3 |

CdO, the coating additionally containing 2 percent, by weight, of very fine zinc powder and being deposited on the sheet to a thickness of 0.3 mm., and said steps of maintaining the coating in such heated condition and effecting such modification are carried out by exposing the coated sheet to a stream of dry hydrogen selenide gas at a temperature of 400° C. for 2 hours.

22. A layer of vitreous or vitrocrystalline material which has been physically strengthened by being subjected to the process as defined in claim 1.

23. A process according to claim 1 wherein the chemical modification comprises introduction of ions into the coating and is effected while said coating is in the solid state.

24. A process according to claim 1 wherein the chemical modification is oxidation of at least one component of the coating.

25. A process according to claim 25 wherein the one component of the composition is a metal element selected from the group consisting of tin, titanium, silicon, vanadium, lead, manganese, aluminum, zirconium, thorium, bismuth and nickel.

26. A process according to claim 25 wherein the one component of the composition is a compound selected from the group consisting of SiO, TiO, SnO and PbO.

27. A vitreous or vitrocrystalline layer, at least marginal surface zones of which are coated with a solid coating having chemically impressed compressive stresses therein, the zones being symmetrically disposed at respectively opposite sides of the layer's median surface.

28. A process according to claim 1 for physically strengthening a layer of vitreous or vitrocrystalline material comprising the steps of:

I. covering at least surface zones of the layer, which are symmetrically disposed at respectively opposite sides of the layer's median surface, with a solid chemically temperable coating having exchangeable ions in its composition and wherein compressive stresses are produced by
  a. chemically tempering the coating while it is in solid state and in a heated condition by exchanging the exchangeable ions for others of a different size followed by
  b. cooling the thus chemically modified coating;
II. maintaining the coating in such heated condition and exchanging the exchangeable ions for others of a different size; and
III. subsequently cooling the resulting chemically modified coating.

29. A process according to claim 1 for physically strengthening a layer of vitreous or vitrocrystalline material comprising the steps of:

I. covering at least surface zones of the layer, which are symmetrically disposed at respectively opposite sides of the layer's median surface, with a solid coating having in its composition at least one oxidizable ingredient and wherein compressive stresses are produced by
  a. chemical modification thereof while the coating is in solid state and in a heated condition by oxidizing the oxidizable ingredient followed by
  b. cooling the thus chemically modified coating;
II. maintaining the coating in such heated condition and effecting the chemical modification; and
III. subsequently cooling the resulting chemically modified coating.

* * * * *